United States Patent [19]
Mykkanen et al.

[11] Patent Number: 5,855,301
[45] Date of Patent: Jan. 5, 1999

[54] ELECTROSTATIC GROUNDING SYSTEM FOR A MANUALLY OPERATED FLUID DISPENSER

[75] Inventors: C. Fred Mykkanen, Fridley; S. Ross Ambrose, Bloomington, both of Minn.

[73] Assignee: Seagate Technology, Inc., Scotts Valley, Calif.

[21] Appl. No.: 723,261

[22] Filed: Sep. 30, 1996

Related U.S. Application Data

[63] Continuation-in-part of Ser. No. 445,183, May 19, 1995, abandoned.

[51] Int. Cl.$^6$ ................................................. B67D 25/00
[52] U.S. Cl. ........................ 222/192; 222/212; 222/386; 361/215
[58] Field of Search ..................................... 222/105, 192, 222/402.1, 190, 212, 386; 361/215, 220; 2/161.6

[56] References Cited

U.S. PATENT DOCUMENTS

| | | | |
|---|---|---|---|
| 1,940,491 | 12/1933 | Freitag | 361/220 |
| 3,596,134 | 7/1971 | Burke | 2/161.6 |
| 4,373,175 | 2/1983 | Mykkanen | 361/220 |
| 4,819,837 | 4/1989 | Goforth | 222/402.1 |
| 4,873,608 | 10/1989 | Yoshimura | 361/220 |
| 4,878,600 | 11/1989 | Derby | 222/105 |
| 5,027,239 | 6/1991 | Hagen | 360/104 |
| 5,215,608 | 6/1993 | Stroud et al. | 156/64 |
| 5,423,458 | 6/1995 | Tourigny | 222/192 |

*Primary Examiner*—Gregory L. Huson
*Attorney, Agent, or Firm*—Kinney & Lange, P.A.

[57] ABSTRACT

An electrostatic grounding system electrically grounds a conductive member of a fixture separated from ground by a supradissipative resistance. The fixture is arranged to be placed in electrical contact with a conductive portion of a disc drive assembly that is in electrical contact with a magnetic head of the disc drive assembly. An electrically conductive engagement device mechanically and electrically engages the conductive member in electrical contact therewith. An electrically conductive coupler is mechanically and electrically connected to the engagement device, and electrically conductive connection means is electrically connected between the conductive coupler and a source of ground potential. In one form, the fixture is a fluid dispenser and an electrically conductive receptacle engages the dispensing member. An electrically conductive mounting member is on the dispenser body, and an electrically conductive arm extends from the mounting member to the conductive receptacle. An electrically conductive glove contacts the mounting member, and a circuit connects the glove to ground. In another form, an electrically conductive rod is supported by the conductive member of the fixture. A conductive receptacle is interference fit with the electrically conductive rod.

47 Claims, 6 Drawing Sheets

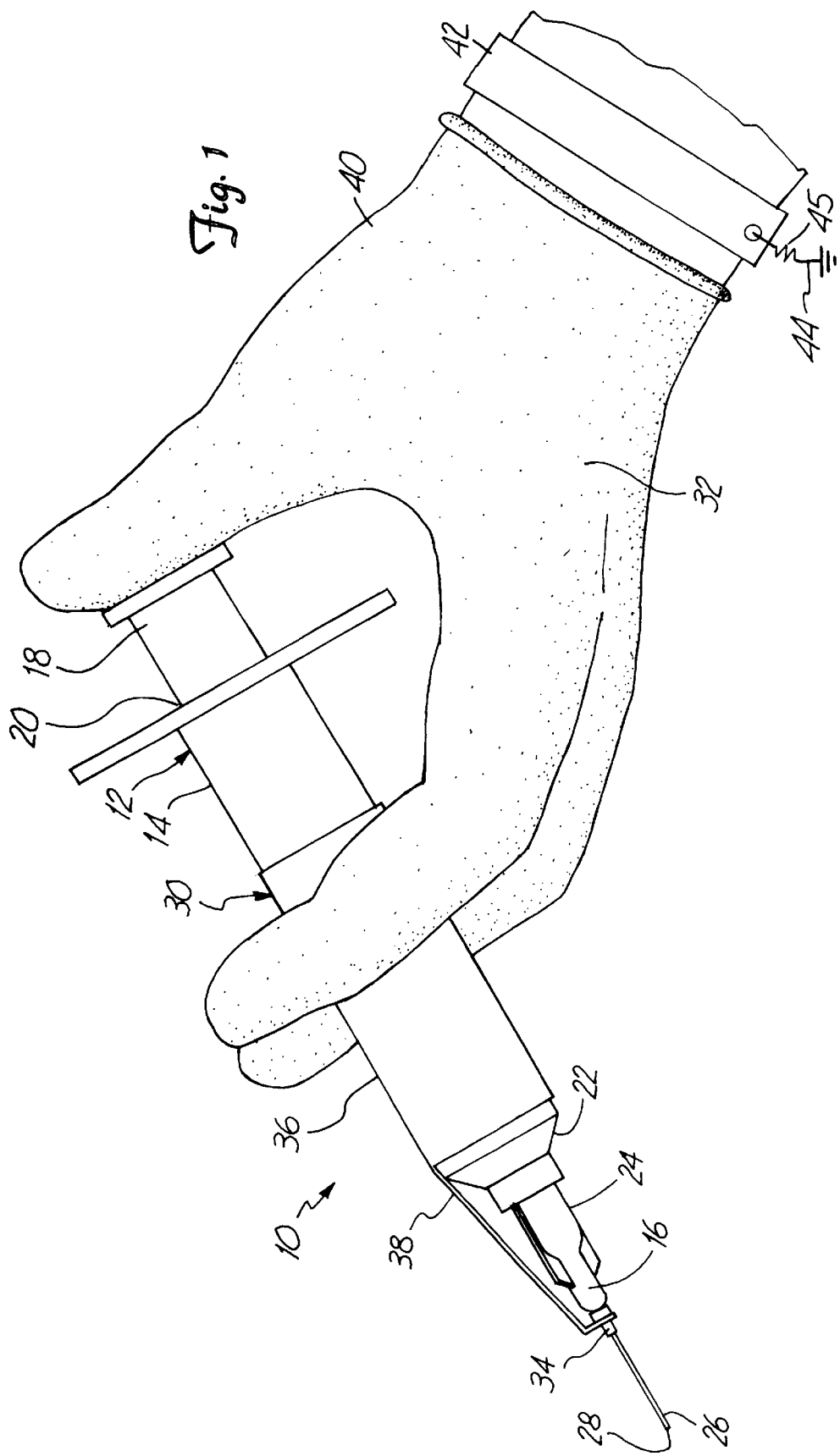

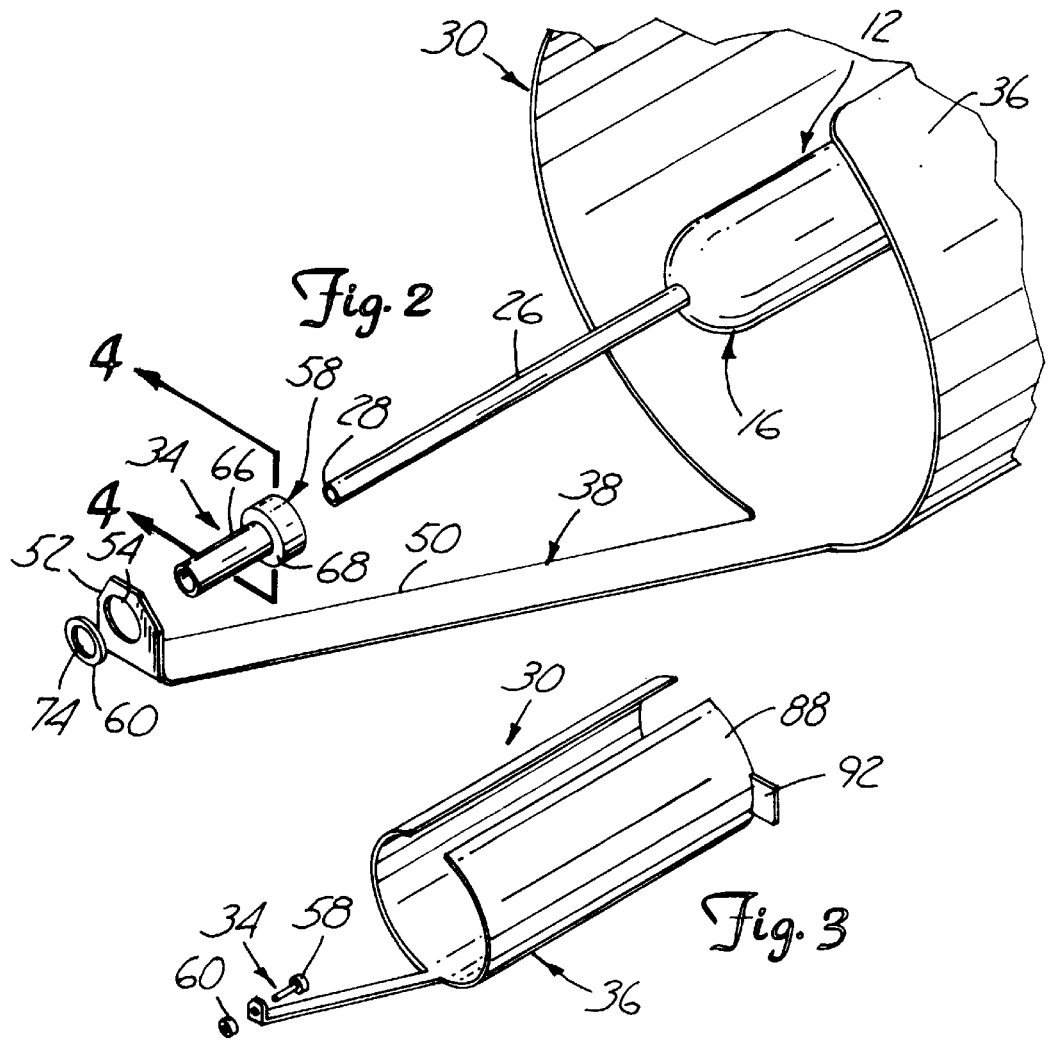
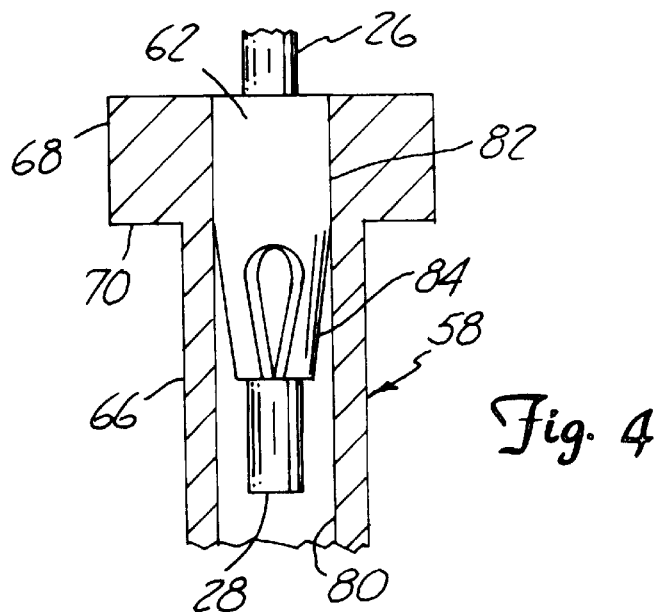

ELECTROSTATIC GROUNDING SYSTEM FOR A MANUALLY OPERATED FLUID DISPENSER

This application is a continuation-in-part of application Ser. No. 08/445,183 filed May 19, 1995 and now abandoned.

BACKGROUND OF THE INVENTION

The present invention relates to devices and instruments for use in assembling a disc drive assembly and its subassemblies. In particular, the present invention relates to an electrical grounding device electrically coupled to a dispenser for dispensing fluids, such as glue and epoxy, upon a surface of the disc drive assembly which is in electrical contact with a magnetic head of the assembly.

The magnetic head stores and retrieves information on a magnetic disc. Several types of magnetic heads are currently in use, including metal-in-gap (MIG) heads, thin film (TF) heads and magnetoresistive (MR) heads. Due to the continual drive to increase storage density in magnetic disc drive units, magnetic heads have become increasingly advanced and sensitive.

Typically, a magnetic head consists of a slider and a transducer. The slider carries the transducer and flies over the surface of the magnetic disc as the disc rotates. The transducer reads and/or writes to the magnetic disc. Electric signals are provided to and received from the transducer via conductors which are typically insulated wires. A glue, such as fluid epoxy, attaches or tacks the wires to bonding pads and sides of the slider. This tacking process, otherwise known as conformal coating, actually coats the wire where the wire is attached to the slider. As a result, the conformal coating process prevents the wires from being pulled loose and also protects the wires from corrosion.

The slider of the magnetic head is supported above the magnetic disc as part of a head/gimbal assembly. As described in Hagen U.S. Pat. No. 5,027,239, herein incorporated by reference, the head-gimbal assembly typically includes at least one support arm, a load beam, a gimbal and the magnetic head discussed above. The support arm is attached to the load beam by a well-known technique referred to as swaging or ball staking. The load arm carries the load beam. The load beam is attached, preferably by laser welding, to the gimbal. Lastly, the gimbal is preferably glued to the slider of the magnetic head by fluid epoxy or other conventional adhesive materials. Typically, the fluid, such as glue or fluid epoxy, applied to surfaces of the slider and the gimbal is dispensed onto the surface from a dispensing syringe which is positioned and controlled either manually or by an automated process.

SUMMARY OF THE INVENTION

An electrostatic grounding system according to the present invention electrically grounds a conductive member of a fixture separated from ground by a supradissipative resistance. The fixture is arranged to be placed in electrical contact with a conductive portion of a disc drive assembly that is in electrical contact with a magnetic head of the disc drive assembly. An electrically conductive engagement device mechanically and electrically engages the conductive member in electrical contact therewith. An electrically conductive coupler is mechanically and electrically connected to the engagement device, and electrically conductive connection means is electrically connected between the conductive coupler and a source of ground potential.

In one form of the invention, the fixture is a fluid dispenser having a body and the electrically conductive member comprises a dispensing member. The conductive engagement device includes an electrically conductive receptacle engaging and electrically connected to the dispensing member. The electrically conductive coupler includes an electrically conductive mounting member on the dispenser body, and an electrically conductive arm extending from the mounting member and supporting the conductive receptacle. The electrically conductive connection means includes an electrically conductive glove arranged to fit a hand of a user of the dispenser so that the glove contacts the mounting member, and a circuit connecting the glove to a source of ground potential.

In another form of the invention, the electrically conductive engagement device comprises an electrically conductive rod mechanically supported by and in electrical contact with the conductive member of the fixture. The electrically conductive coupler comprises a conductive receptacle receiving the electrically conductive rod, the electrically conductive receptacle including means coupled to the receptacle for mechanically and electrically engaging the rod. In different aspects of this form of the first embodiment, the rod is interference fitted to the conductive member or is rigidly attached to the conductive member. In either case, the rod is preferably interference fit to the receptacle.

A fluid dispenser according to the present invention is separated from ground by a supradissipative resistance. The dispenser has an dispensing member which is placed in contact with a surface of the disc drive assembly in electrical contact with a magnetic head of the assembly. An electrically conductive receptacle engages and electrically connects to the dispensing member. An electrically conductive means is electrically connected between the conductive receptacle and ground to ground the dispenser to prevent damage to the magnetic head caused by static discharge from the dispenser.

In one form, the dispensing member is a needle and the receptacle is a conductive tube through which the needle is inserted. A conductive mounting member is configured for attachment to the dispenser and is electrically connected to the receptacle. The electrically conductive means includes a conductive glove arranged to fit the hand of a user so that the glove contacts the mounting member. A safety resistor in series between the glove and ground completes the grounding circuit.

Another embodiment of a fluid dispensing system, a dispenser has a conductive surface defining an opening through which fluids are dispensed onto the disc drive surface. Grounding means is electrically connected to the conductive surface for electrically grounding the conductive surface to prevent damage to the magnetic head caused by static discharge from the conductive surface. The grounding means includes an electrically conductive receptacle engaging the conductive surface, and electrically conductive means electrically connected between the conductive receptacle and ground.

A device for grounding a needle of a dispenser according to the present invention includes an electrically conductive receptacle that engages and electrically connects to the needle. Electrical conductive means electrically connects to the conductive receptacle for electrically grounding the receptacle.

A system is provided for applying fluids onto a surface in electrical contact with a magnetic head. A syringe has a tube through which fluid is dispensed onto the surface and a barrel for being grasped by an operator. An electrically conductive receptacle engages and is electrically connected to the tube. An electrically conductive mounting member is attached to the barrel of the syringe. An electrical conductor extends from the mounting member to the receptacle. A grounded electrically conductive glove worn by the operator electrically contacts the electrically conductive mounting member.

In another embodiment of the invention, a fixture for assembling or testing the disc drive assembly includes a conductive member arranged to be in electrical contact with a magnetic head of the disc drive assembly. The conductive member is ordinarily separated from ground potential by a supradissipative resistance such that an electrostatic potential can form on the fixture. The electrostatic grounding system includes an electrically conductive rod mechanically and electrically coupled to the conductive member. A rod engaging member engages the rod, and an electrically conductive connecting device electrically connects the rod engaging member to ground. Preferably, the rod engaging member includes an electrically conductive receptacle having a bore in interference fit with the rod. In one form of this embodiment, the rod is in interference fit to a bore in the conductive member. In another form of the second embodiment, the electrically conductive rod includes a head rigidly mounted to a surface of the conductive member.

BRIEF DESCRIPTION OF THE DRAWINGS

FIG. 1 is a perspective view of an electrical grounding system according to the presently preferred embodiment of the present invention including a grounding attachment coupled to a dispenser.

FIG. 2 is an enlarged fragmentary view of the dispenser and the grounding attachment of FIG. 1.

FIG. 3 is an exploded perspective view of the grounding attachment of FIG. 1.

FIG. 4 is a section view of a receptacle of the grounding attachment with the dispenser partially disposed within the receptacle.

DETAILED DESCRIPTION OF THE PREFERRED EMBODIMENTS

Figure 5:
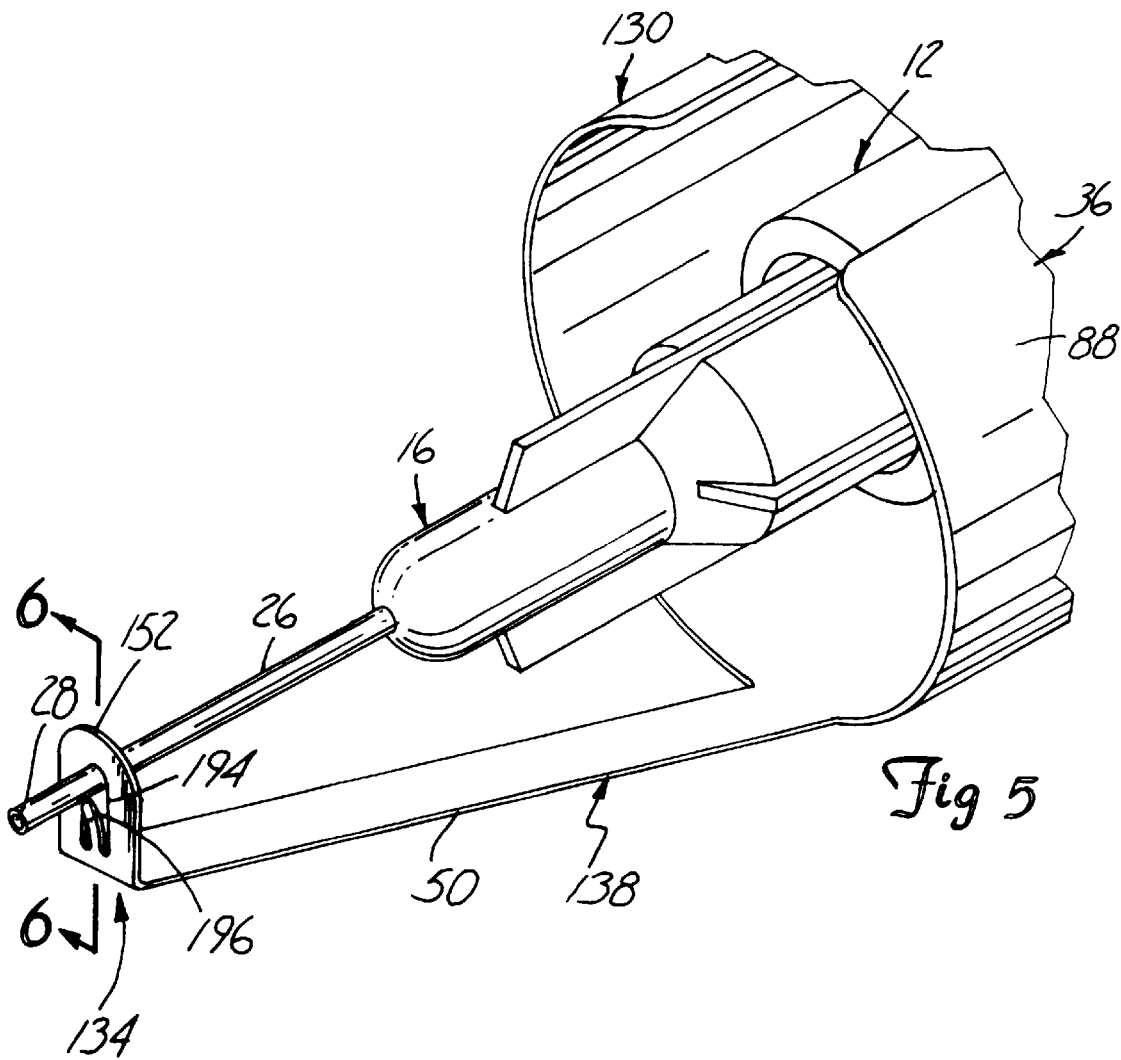
FIG. 5 is an enlarged fragmentary view of an alternate embodiment of the grounding attachment and the receptacle.

FIG. 1 illustrates a device or instrument for use in assembling a disc drive assembly or its sub-assemblies. In particular, FIG. 1 illustrates an electrical grounding system 10 electrically coupled to dispenser 12. Dispenser 12 is an example of an instrument used for assembling a disc drive assembly. In particular, dispenser 12 meters and dispenses precise amounts of glue or coatings, such as fluid epoxy, to surfaces of the magnetic head, including the slider, transducer, and gimbal (not shown) to attach the slider to the gimbal and to apply a conformal coating over wires coupled to the transducer and the slider of the magnetic head. The conformal coating provides the wire with strain release and prevents the wires from being pulled loose. The conformal coating applied to the wires also prevents corrosion of the wires. Dispenser 12 preferably comprises a syringe supplied by E. F. D. Incorporated of East Providence, R.I.

Dispenser 12 generally includes barrel 14, dispensing tip 16, and piston 18. Because dispenser 12 is used for assembling disc drives or their sub-assemblies, each component of dispenser 12 is preferably nonmagnetic and contaminant free (i.e. excluding such elements as carbon and silicon). Barrel 14 is generally cylindrical or tubular in shape and includes a first open end 20 and a second narrowing end 22 opposite the first end. Barrel 14 acts as a reservoir and contains the fluid epoxy of dispenser 12. Barrel 14 is preferably transparent to permit amounts of fluid within barrel 14 to be visually detected. Barrel 14 may have various diameters and may contain various amounts of fluid epoxy. In the example illustrated in FIG. 1, barrel 14 and the remaining components of dispenser 12 are sized and configured for manual dispensing of epoxy from dispenser 12. As can be appreciated, barrel 14 and dispenser 12 have any one of various sizes when fluid epoxy is dispensed by an automated process (not illustrated). Barrel 14 is preferably formed from silicon free polypropylene to prevent contamination of the disc drive.

Dispensing tip 16 is sealingly coupled to second narrowing end 22 of barrel 14. Dispensing tip 16 includes hub 24 and tube or needle 26. Hub 24 is fixedly secured about needle 26 and is configured for coupling to second narrowing end 22 of barrel 14. Preferably, hub 24 includes exterior threads for threadably engaging exterior threads defined by end 22 of hub 24. As a result, dispensing tip 16 may be easily replaced. Alternatively, hub 24 of dispensing tip 16 is integrally formed as part of barrel 14. Hub 24 is preferably formed from a silicon free homopolymer polypropylene with an ultra-violet block additive. The ultra-violet block additive is preferably color-coded to indicate a diameter of the opening defined by dispensing tip 16 through which fluid epoxy is dispensed.

Needle 26 is a hollow rod or tube having a highly controlled inner diameter for dispensing precise amounts of glue or epoxy. Needle 26 has an opening 28 at one end thereof through which the fluid is dispensed. Although shown as having a uniform outer diameter and as having an opening at the distal end, needle 26 may alternatively have a narrowing outer diameter and an opening through a sidewall of the tube. For contamination concerns, needle 26 is formed of a conductive material, such as 304 stainless steel-passivated. Needle 26 and hub 24 define a highly controlled fluid conduit through which fluid epoxy from within barrel 14 is emitted out opening 28 by actuation of piston 18.

Piston 18 is conventionally known and includes a bulb (not shown) for insertion into barrel 14. Actuation of piston 18 causes epoxy within barrel 14 to be dispensed out opening 28 of needle 26 onto a surface of the magnetic head or the gimbal. For illustration purposes, FIG. 1 shows piston 18 as being manually actuated. However, piston 18 may alternatively be automatically operated by an automated process as is conventionally known. Furthermore, for more precise control of fluid dispensing, an air operated dispensing system, a timed-pulse air operated dispensing system, or other conventionally known means may be used in place of piston 18 for forcing fluid out needle 26 of dispenser 12.

Because dispenser 12 applies fluid epoxy to extremely small and precise locations or surfaces of the magnetic head or gimbal, the needle of dispenser 12 is often brought into very close or even physical contact with the surface upon which the epoxy is being deposited. It has been discovered that because components of dispenser 12 are electrically separated from ground by a supradissipative resistance (i.e. a resistance greater than about $1.0 \times 10^{11}$ ohms), electrostatic charge builds up within the material of dispenser 12. As a result, the electrostatic charge at needle 26 is or may be discharged when needle 26 is positioned in close or physical contact with a surface upon which epoxy is being deposited. Because the surfaces upon which the fluid epoxy are deposited are electrically connected or coupled to the magnetic head, the electrostatic discharge from needle 26 is also conducted to the magnetic head by direct electrical continuity or dielectric breakdown. It has been discovered that this electrostatic discharge to the magnetic head may actually cause damage to advanced magnetic heads which are extremely sensitive to even extremely low voltages. As a result, based upon this discovery, grounding system 10 is provided for electrically grounding needle 26 to ensure that needle 26 and the surface upon which epoxy is being deposited are at an equal or near equal electrical potential. Consequently, the grounding system of the present invention provides a conductive path between the needle of the syringe and a good source of ground potential. The conductive path must, for purposes of discharging electrostatic potentials, have a resistance below the supradissipative resistance, namely below about $10^{11}$ ohms.

Grounding system 10 electrically grounds conductive needle 26 of dispenser 12 and permits static charge to be drained from needle 26. Grounding system 10 includes grounding attachment 30 and ground connection 32. Because grounding system 10 is used for grounding instruments used in assembling disc drives or their subassemblies, each component of grounding system 10 is preferably non-magnetic and contaminant free (i.e. excluding such elements as carbon and silicon). Grounding attachment 30 mounts upon dispenser 12 and generally includes receptacle 34, conductive mounting member 36 and conductive arm 38. Receptacle 34 is made of a highly electrically conductive material and receives or holds needle 26 of dispenser 12. Because needle 26 is preferably made of stainless steel, which is electrically conductive, receptacle 34 is electrically connected adjacent to or proximate a surface of needle 26 most likely to come into close or actual physical contact with a surface of the magnetic head or gimbal. This surface on dispenser 12 is the surface of needle 26 adjacent opening 28 through which fluid epoxy is dispensed. Receptacle 34 is grounded through arm 38, mounting member 36 and ground connection 32. Preferably, receptacle 34 is grounded to a good source of ground potential, such as an AC third wire ground connection found in buildings. As a result, receptacle 34 electrically grounds the surface of dispenser 12 most likely to come into contact with the surface of the disc drive assembly that is electrically coupled to the sensitive magnetic head. Consequently, receptacle 34 prevents damage to the magnetic head caused by electrostatic discharge from needle 26 of dispenser 12.

Mounting member 36 is configured for attachment to barrel 14 of dispenser 12 and is made of a highly electrically conductive material. Mounting member 36 is preferably made of non-magnetic resilient spring stainless steel. Mounting member 36 is preferably a sleeve configured for releasably mounting to barrel 14 so that grounding attachment 30 may be removed from dispenser 12 when barrel 14 is being refilled with fluid epoxy or when dispensing tip 16 is being replaced. Alternatively, mounting member 36 may be fixedly secured to barrel 14. Mounting member 36 is electrically grounded by ground connection 32. As a result, mounting member 36 grounds and drains static charge build-up from barrel 14 of dispenser 12. As shown by FIG. 1, mounting member 36 is preferably configured for being grasped by an operator's hand. Alternatively, when a machine or other automated process automatically dispenses fluid epoxy from dispenser 12, mounting member 36 may have any one of a variety of shapes.

Conductive arm 38 extends from mounting member 36 to receptacle 34 and is made of a highly electrically conductive material. Conductive arm 38 is preferably made from spring stainless steel. Conductive arm 38 establishes an electrical conductive path from receptacle 34 to mounting member 36 and ultimately to ground through ground connection 32.

Ground connection 32 electrically grounds grounding attachment 30 and includes conductive glove 40, wrist strap 42 and electrical conductor 44. Conductive glove 40 sized for fitting upon an operator's hand. Preferably, glove 40 is made from a synthetic rubber possessing conductive properties such as Nitrilite supplied by Ansell-Edmont Industrial Inc. of Coshocton, Ohio. This material typically has a resistance between about $10^8$ and $10^{11}$ ohms, depending on humidity and other environmental conditions. For purposes of this disclosure, the term "conductive," refers to any material that has an electrical resistance between zero ohms and about $1.0 \times 10^{11}$ ohms, and includes dissipative materials but not supradissipative materials. Therefore, glove 40 is electrically conductive. Glove 40 prevents contaminating particles and oils from the operator's hand from being deposited upon components of the disc drive assembly. Because conductive glove 40 is made of an electrically conductive material, glove 40 conducts static charge build-up from grounding attachment 30 and needle 26 to tissue of the operator when glove 40 is placed in contact with attachment 30. Glove 40 conducts the static charge away from grounding attachment 30 through the tissue of the operator to wrist strap 42 which is electrically connected to ground. As a result, glove 40 is electrically grounded via wrist strap 42. Alternatively, glove 40 may be formed from a material such that electrical charges may be conducted across and along the surface of the glove itself so that the glove may be directly electrically grounded by any conventional grounding connections.

Wrist strap 42 preferably encircles the operator's wrist and is electrically connected to conductive glove 40. Wrist strap 42 is formed from a highly electrically conductive material. An example of such a wrist strap is disclosed in Mykkanen, U.S. Pat. No. 4,373,175. Preferably, wrist strap 42 is a metal stretch band or woven wire band in direct electrical contact with the skin of the operator. As a result, an electrical pathway is formed from glove 40 through the tissue of the operator to wrist strap 42. Wrist strap 42 is electrically coupled to conductor 44. Conductor 44 is electrically connected to a good source of ground potential. For safety reasons, a 250 ohm to 10 megohm resistor 45 is inserted in series with conductor 44. However, because the total resistance in series remains below $1.0 \times 10^{11}$ ohms, grounding of electrostatic charge is not negated. As a result, conductive glove 40, wrist strap 42 and conductor 44 of ground connection 32 provide a reliable electrical grounding connection to grounding attachment 30 and needle 26 of dispenser 12 during manual dispensing of fluid epoxy from dispenser 12.

Overall, grounding attachment 30, conductive glove 40, wrist strap 42 and conductor 44 form an electrical pathway from needle 26 to ground for draining static charge. The electrical pathway formed by grounding attachment 30, glove 40, the tissue of the operator, wrist 42 and conductor 44 has a maximum total resistance in series of about $1.0 \times 10^{11}$ ohms. Preferably, the electrical pathway has as low of an electrical resistance as possible between needle 26 and ground. Because the electrical pathway has a resistance in series at least within the conductive range of resistance below about $10^{11}$ ohms, grounding system 10 effectively drains static charge from needle 26 of dispenser 12 and limits the amount of voltage existing at the tip of needle 26. In addition, grounding system 10 provides a grounding connection that is reliable, ergonomic and contaminant free.

As discussed above, fluid epoxy may alternatively be automatically dispensed from dispenser 12 by an automated process. As a result, conductive glove 40 and wrist strap 42 of ground connection 32 may be omitted and conductor 44 may be directly electrically coupled to grounding attachment 30. In particular, conductor 44 may be directly electrically attached to mounting member 36 of attachment 30. Furthermore, when fluid epoxy is automatically dispensed from dispenser 12, grounding attachment 30 may simply comprise receptacle 34, whereby conductor 44 is directly electrically connected to receptacle 34. As can now be appreciated, electrical grounding system 10 may have a variety of designs and configurations for electrically grounding and draining static charge buildup from instruments, such as dispenser 12 having needle 26, used for assembling disc drives and their sub-assemblies.

FIGS. 2–4 illustrate grounding attachment 30 in greater detail. FIG. 2 is an enlarged fragmentary exploded view of grounding attachment 30 partially removed from dispenser 12. FIG. 3 is an exploded perspective view of grounding attachment 30 completely removed from dispenser 12. FIG. 4 is a cross-sectional view of needle 26 partially inserted through receptacle 34. FIG. 2 illustrates receptacle 34 and conductive arm 38 in greater detail. As best shown by FIG. 2, conductive arm 38 includes band 50 and receptacle mount 52. Band 50 is made of a highly electrically conductive material and extends between mounting member 36 and receptacle mount 52. Preferably, band 50 is integrally formed with mounting member 36 and receptacle mount 52. Band 50 extends inward from mounting member 36 towards an axial center line of needle 26 and dispenser 12. As can be appreciated, band 50 and conductive arm 38 may alternatively be fixedly mounted to mounting member 36 at a desired angle with respect to mounting member 36. Band 50 is preferably formed from a rigid, yet resilient, material such as spring stainless steel. Because band 50 is preferably formed from a rigid, yet resilient conductive material, band 50 maintains receptacle mount 52 and receptacle 34 at a substantially fixed position relative to mounting member 36. Because band 50 maintains receptacle mount 52 and receptacle 34 at a substantially fixed position relative to mounting member 36, receptacle 34 is repositioned in substantial alignment with needle 26. As a result, grounding attachment 30 may be more easily mounted to dispenser 12. In addition, because band 50 extends inward towards the axial center line of needle 26 of dispenser 12, conductive arm 38 does not impair the vision of the operator when manually dispensing fluids from dispenser 12. Because band 50 is rigid, yet resilient, band 50 is durable as well. Consequently, band 50 enables grounding attachment 30 to be repeatedly removed from dispenser 12 when dispenser 12 is being refilled or when dispensing tip 16 is being replaced and also permits grounding attachment 32 to be remounted upon dispenser 12 for reuse. Alternatively, conductive arm may comprise any well known conducting structure such as a conductive wire.

Receptacle mount 52 is preferably formed by bending band 50 at an angle towards the axial center line of dispenser 12. Receptacle mount 52 is preferably integral with band 50 and formed from the same highly electrically conductive material as that of band 50. Mount 52 defines aperture 54 having a center in alignment with the axial center line of needle 20 of dispenser 12. Aperture 54 preferably has a diameter sized for the reception of receptacle 34 through which needle 26 extends.

As shown by FIG. 4, receptacle 34 includes shell 58, capture washer 60 (FIG. 2) and contact 62. Shell 58 is a generally tubular shaped member made of a highly electrically conductive material such as a brass alloy. Shell 58 is preferably tin plated. Shell 58 has a first outer diameter 66 which widens to a second outer diameter 68 to form shoulder 70. Outer diameter 66 is sized for being received and extending through aperture 54 of receptacle mount 52. Shell 58 of receptacle 34 is preferably press fit in receptacle mount 52. However, outer diameter 68 is preferably sized larger than the diameter of aperture 54 so that shoulder 70 abuts receptacle mount 52.

Capture washer 60 is a conventional washer made of highly electrically conductive material, preferably tin plated brass, and defines an inner diameter 74. Inner diameter 74 is sized for receiving in close tolerance outer diameter 66 of shell 58. Because both capture washer 60 and receptacle shell 58 are preferably formed from tin plated brass, receptacle shell 58 and washer 60 are easily soldered together at low temperatures. As a result, capture washer 60 mounts receptacle shell 58 of receptacle 34 to receptacle mount 52 of conductive arm 38 without the high heat which would otherwise be required for silver soldering receptacle 34 directly to stainless steel mount 52. It has been discovered that the extreme heat required for silver soldering receptacle 34 to stainless steel mount 52 causes oxidation and annealing of contact 62 and reduces electrical conductivity. As a further assurance of electrical contact between receptacle 34 and receptacle mount 52, capture washer 60 and receptacle shell 58 are soldered to each other so that shoulder 70 of shell 58 and washer 60 are flush and in abutting contact with receptacle mount 52. Because washer 60 merely captures receptacle shell 58 to mount 52, shell 58 and washer 60 may be easily removed by reheating the solder and replaced if necessary, thereby extending the useful and reusable life of grounding attachment 30. In addition, receptacle 34 is securely held in place with respect to the axial center line of needle 26 and dispenser 12 for ease of mounting and removing grounding attachment 30 to and from needle 26 and dispenser 12.

As shown by FIG. 4, shell 58 further defines a bore with an inner diameter 80 sized for the reception of contact 62 and needle 26. Preferably, a surface of inner diameter 80 is tin plated nickel. Alternatively, the surface may comprise gold plated nickel. Contact 62 is formed from a highly electrically conductive resilient material such as a beryllium copper alloy. Preferably contact 62 has an outer diameter 82 sized so that contact 62 may be captivated within the inner diameter 80 of shell 58. The surface defining the outer diameter 82 is preferably tin plated nickel. Alternatively, the surface may be formed from gold plated nickel. As a result, contact 62 is securely electrically coupled to shell 58 to provide reliable electrical connection. Contact 62 defines an interior passage centrally extending through contact 62 and shell 58.

Contact 62 further includes a plurality of prongs or leaves 84. Leaves 84 integrally extend from an end of contact 62 into an interior of shell 58. Leaves 84 are angled towards an axial center line of contact 62. Leaves 84 are preferably formed from a resilient material having a memory such that upon insertion of needle 26 into the passage defined by contact 62, leaves 84 grasp needle 26 to axially center needle 26 and to insure a reliable electrical connection or continuity of contact between needle 26 and contact 62 without the need for soldering needle 26 to receptacle 34. Thus, leaves 84 allow needle 26 to be removed, enabling grounding attachment 30 to be reused.

Furthermore, because the force used to insert and remove needle 26 from contact 62 of receptacle 34 is distributed to each of the plurality of leaves, contact 62 is less likely to be damaged upon repeated insertion and removal of needle 26 into and out of receptacle 34. Because needle 26 is inserted concentrically through contact 62 and shell 58, leaves 84 of contact 62 and needle 26 itself are less likely to be damaged from incorrect or misaligned insertion of needle 26. As a result, grounding attachment 30 may be removed from dispenser 12 while dispenser 12 is being filled or when dispensing tip 16 is being replaced so that attachment 30 may be reused. Shell 58 and contact 62 preferably comprise pin receptacles conventionally used in circuit boards and supplied by Mill-Max Manufacturing Corporation of Oyster Bay, N.Y.

As best shown by FIG. 3, mounting member 36 is preferably an elongated sleeve 88 having an inner diameter configured for attachment to barrel 14 of dispenser 12 (shown in FIG. 1). Sleeve 88 has an inner diameter sized for at least partially surrounding barrel 14 of dispenser 12. Preferably, the inner diameter of sleeve 88 is sized in close tolerance with an outer diameter of barrel 14 so that sleeve 88 compresses onto barrel 14 and remains in place and in contact with barrel 14 unless forcefully removed. In the preferred embodiment, sleeve 88 is C-shaped so that sleeve 88 may be temporarily expanded for removal of sleeve 88 and grounding attachment 30 from dispenser 12. In addition, because sleeve 88 is C-shaped, sleeve 88 allows the operator to visually inspect barrel 14 in the space between the legs of the C shape to detect the amount of epoxy remaining within barrel 14 of dispenser 12. Sleeve 88 is preferably formed from a highly electrically conductive material which is resilient and has a shape memory such as spring stainless steel. When grounding attachment 30 is used in conjunction with glove 40, wrist strap 42 and conductor 44 (manual dispensing), sleeve 88 preferably has a surface area sized and configured for grasping by an operator's hand within glove 40. Alternatively, tab 92 (FIG. 3) may be provided to separately or additionally provide a ground connection to ground conductor 44. Tab 92 integrally projects outward and away from sleeve 88 and permits a jumper wire (not shown) to be easily attached to grounding attachment 30 or direct connection of grounding conductor 44 to tab 92. When grounding attachment 30 is used in conjunction with an automated dispensing process, tab 92 provides ground connection for sleeve 88. As can be appreciated, various mechanisms may be used to electrically ground grounding attachment 30.

Figure 6:
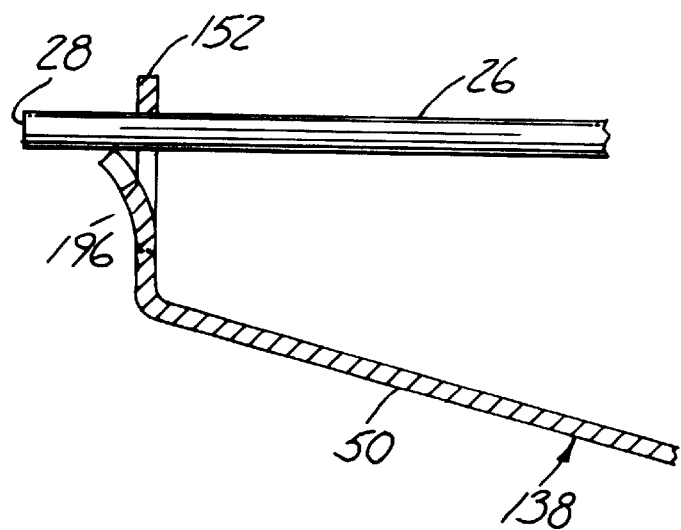
FIG. 6 is a section view of the grounding attachment and the receptacle of FIG. 5 with the dispenser partially disposed within the receptacle.

FIGS. 5 and 6 illustrate an alternative grounding attachment 130. FIG. 5 is an enlarged fragmentary exploded perspective view of needle 26 of dispenser 12 partially extending through and electrically coupled to grounding attachment 130. FIG. 6 is a cross-sectional view of needle 26 inserted through and electrically connected to receptacle 134. For ease of illustration, those elements of FIGS. 5 and 6 which are the same as those elements of FIGS. 2–4 are numbered similarly.

Receptacle 34, conductive arm 38 and receptacle mount 52 in FIGS. 2–4 are replaced with receptacle 134, conductive arm 138 and receptacle mount 152 of FIG. 5, respectively. Receptacle mount 152 extends inward towards an axial center line of needle 26 and dispenser 12 and is integrally formed as part of receptacle 134. Receptacle mount 152 directly contacts needle 26 of dispenser 12.

Receptacle 134 generally comprises a clip configured for holding needle 26. In the illustrated embodiment, the clip of receptacle 134 is formed by cutting an inverted U-shaped incision or slot 194 to create a finger 196. Slot 194 receives needle 26 of dispenser 12. However, slot 194 is preferably sized so as to have a width on either side of finger 196 less than an outer diameter of needle 26. Slot 194 is preferably formed by an electrical cutting process known as EDM (electric discharge machining). Finger 196 is preferably formed from a highly electrically conductive resilient material. Finger 196 is preferably formed from the same material as band 50 of conductive arm 138. Alternatively, the clip of receptacle 134 may be mounted to conductive arm 138.

As best shown by FIG. 6, because the width of slot 194 on either side of finger 196 is sized smaller than the outer diameter of needle 26, insertion of needle 26 through slot 194 deflects finger 196 sideways so that finger 196 pivots left or right depending upon how needle 26 is inserted. Because finger 196 is resilient, finger 196 acts as a prong to resiliently apply a force against the side surface of needle 26 to pressure or clamp needle 26 against receptacle mount 152. Consequently, the clip formed by slot 194 and finger 196 securely holds needle 26 in place and insures a reliable and consistent electrical connection between needle 26 and receptacle 134 of grounding attachment 130. As can be appreciated, the clip formed by receptacle 34, 134 may have a variety of alternate configurations and designs for establishing a reliable, continuous electrical connection between needle 26 and grounding attachment 30, 130 and for securing needle 26 in place.

Figure 7:
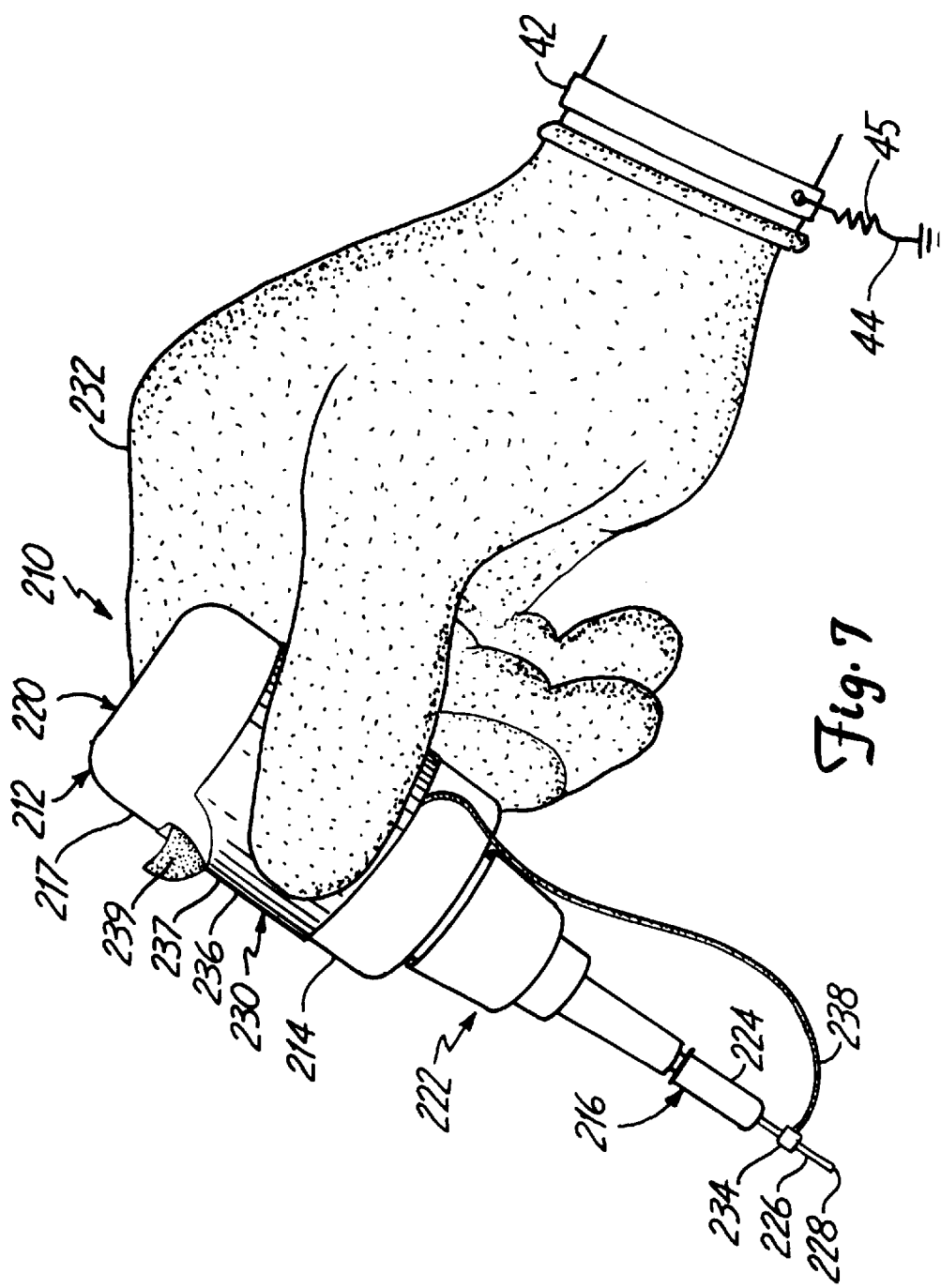
FIG. 7 is a perspective view, as in FIG. 1, of an electrical grounding system according to a first modification of the present invention including a grounding attachment coupled to a dispenser.

FIGS. 7–11 illustrate alternative embodiments of grounding system 10 shown in FIGS. 1–6. FIG. 7 illustrates electrical grounding system 210 electrically coupled to dispenser 212. Dispenser 212 is an example of an instrument for assembling a disc drive assembly (not shown). In particular, dispenser 212 meters and dispenses exact amounts of glue or coatings, such as fluid epoxy, to surfaces of a magnetic head, including a slider, a transducer and a gimbal (not shown), to attach the slider to the gimbal or to apply a conformal coating over wires coupled to the transducer and the slider of the magnetic head. Dispenser 212 includes barrel 214 and dispensing tip 216. Because dispenser 212 is used for assembling disc drives or other subassemblies, each component of dispenser 212 is preferably nonmagnetic and contaminant free (i.e. excluding such elements are carbon and silicon). Barrel 214 is a generally hollow container configured for holding substances such as glue or coatings used in assembling a disc drive assembly. Barrel 214 acts as a reservoir and contains the substance such as fluid epoxy of dispenser 212. Barrel 214 includes a first closed end 220 and a second opposite narrowing open end 222 opposite the first end. Barrel 214 has an outer contour or shape which defines a surface 217 preferably configured for being grasped by an operator during the dispensing of material from dispenser 212. In the example illustrated in FIG. 7, barrel 214 and the remaining components of dispenser 212 are sized and configured for manual dispensing of epoxy from dispenser 212. Although barrel 214 is illustrated as having a generally oval-shaped cross-section, barrel 214 may alternatively have any one of a variety of various sizes and shapes independent of whether material is manually dispensed from dispenser 212 or is dispensed by an automated process (not illustrated). Barrel 214 is preferably formed from silicon free polypropylene to prevent contamination of the disc drive. Barrel 214 is preferably transparent to permit amounts of fluid or material within barrel 214 to be visually detected.

Dispensing tip 216 is sealingly coupled to second narrowing end 222 of barrel 214. Dispensing tip 216 includes hub 224 and tube or needle 226. Hub 224 is fixedly secured about needle 226 and is configured for coupling to second narrowing end 222 of barrel 214. Preferably, hub 224 includes exterior threads for threadably engaging exterior threads defined by end 222 of hub 224. As a result, dispensing tip 216 may be easily replaced. Alternatively, hub 224 of dispensing tip 216 is integrally formed as part of barrel 214. Hub 224 is preferably formed from a silicon free homopolymer polypropylene with an ultra-violet block additive. The ultra-violet block additive is preferably colored to indicate a diameter of the opening defined by dispensing tip 216 through which fluid epoxy is dispensed.

Needle 226 is a hollow rod or tube having a highly controlled inner diameter for dispensing precise amounts of material such as glue or epoxy. Needle 226 has an opening 228 at one end thereof through which fluid or material is dispensed. Although shown as having a uniform outer diameter and as having an opening at the distal end, needle 226 may alternatively have a narrowing outer diameter and an opening through a sidewall of the tube. For contamination concerns, needle 226 is formed of a conductive material, such as 304 stainless steel-passivated. Needle 226 and hub 224 define a controlled fluid conduit through which fluid epoxy from within barrel 214 is emitted out opening 228 by compression of barrel 214. As can be appreciated, barrel 214 may alternatively be configured similar to barrel 14 (shown in FIG. 1) and may additionally include a piston for dispensing fluid epoxy either manually or by an automated process.

Because dispenser 212 applies fluid epoxy to extremely small and precise locations or surfaces of the magnetic head or gimbal, the needle of dispenser 212 is often brought into very close or even physical contact with the surface upon which the epoxy is being deposited. Grounding system 210 is provided for electrically grounding needle 226 to ensure that needle 226 and the surface upon which epoxy is being deposited are at an equal or near equal electrical potential.

Similar to grounding attachment 30, grounding attachment 230 provides an electrical pathway from needle 226 to ground for draining static charge. For ease of illustration, those elements of grounding attachment 230 which are the same as corresponding elements of grounding attachment 30 are numbered similarly. Grounding attachment 230 includes receptacle 234, conductive mounting member 236 and conductive arm 238. Receptacle 234 is similar to receptacle 34 (shown in FIGS. 1–4) except that receptacle 234 does not require capture washer 60. Receptacle 234 is made of a highly electrically conductive material and receives or holds needle 226 of dispenser 212. Because needle 226 is preferably made of stainless steel, which is electrically conductive, receptacle 234 is electrically connected adjacent to or proximate a surface of needle 226 most likely to come into close or actual physical contact with a surface of the magnetic head or gimbal. This surface of dispenser 212 is the surface of needle 226 adjacent opening 228 through which fluid epoxy is dispensed. Receptacle 234 is grounded through conductive arm 238, mounting member 236 and ground connection 32. Receptacle 234 is preferably grounded to a good source of ground potential. As a result, receptacle 234 electrically grounds the surface of dispenser 212 most likely to come into contact with the surface of the disc drive assembly that is electrically coupled to the sensitive magnetic head. Consequently, receptacle 234 prevents damage to the magnetic head caused by electrostatic discharge from needle 226 of dispenser 212.

Conductive arm 238 extends from receptacle 234 to mounting member 236 to electrically connect receptacle 234 and mounting member 236. Conductive arm 238 is preferably made of an electrically conductive manually pliable material having a thickness such that arm 238 may be readily bent or manually deformed by an operator using dispenser 212. Because conductive arm 238 is manually pliable, arm 238 may be easily bent or deformed to allow receptacle 234, mounted to an end of arm 238, to be repositioned with respect to or removed from needle 226 without having to move mounting member 236 with respect to barrel 214 or having to remove mounting member 236 from barrel 214. As a result, needle 226 may be easily removed for cleaning or replacement. In addition, because conductive arm 238 is manually pliable, conductive arm 238 may be easily bent or adjusted as necessary for ergonomic purposes to assist the operator in viewing needle 226 during the dispensing of fluid epoxy on a surface of the disc drive assembly.

Conductive arm 238 is preferably a multi-strand interwoven braid of at least one electrically conductive material. Because conductive arm 238 is preferably made from a multi-strand interwoven braid of at least one electrically conductive material, conductive arm 238 is stronger and more robust as compared to a single strand of electrically conductive material. As a result, conductive arm 238 may be repeatedly bent and flexed to replace or clean needle 226 a multitude of times without breaking or severing arm 238. Electrically conductive arm 238 preferably has a width sufficient for enabling receptacle 234 to be inserted through arm 238 yet small enough so as to be lightweight and so as to not interfere with the viewing of needle 226 during dispensing of fluid epoxy. Conductive arm 238 preferably has a thickness as thin as possible so that arm 238 is lightweight and flexible or pliable, yet thick enough for the strength and durability. Conductive arm 238 preferably has a width of approximately 1/32 of an inch (0.79 mm) and a nominal thickness of about 0.020 inches (0.50 mm). Conductive arm 238 preferably has a length greater than the distance spacing apart opening 228 and mounting member 236 such that receptacle 234 may be removed from needle 226 without moving or adjusting mounting member 236 with respect to barrel 214. Lastly, conductive arm 238 is preferably resistant to corrosion and oxidation. Preferably, conductive arm 238 is formed from a tinned copper braid such as Alpha Part Number 1222 supplied by Alpha Wire Corporation of Elizabeth, N.J. Because conductive arm 238 is formed from a copper braid, conductive arm 238 is extremely manually pliable or flexible and electrically conductive. Because the copper braid is tinned, the copper braid is resistant to corrosion and oxidation. In addition, the copper braid may be easily soldered at a low temperature to receptacle 234 which is preferably formed from a tin plated brass.

Mounting member 236 attaches to barrel 214 of dispenser 212 and is electrically coupled to conductive arm 238. Mounting member 236 is manually pliable and adaptable so that mounting member 236 conforms to and wraps at least partially about dispenser 212. Because mounting member 236 is manually pliable, mounting member 236 is adaptable so as to conform to wrap at least partially about dispenser 212. As a result, mounting member 236 mounts conductive arm 238 to barrel 214 and provides a conductive surface along surface 217 of barrel 214 independent of the shape and configuration of barrel 214 of dispenser 212. Consequently, mounting member 236 enables grounding system 210 to be easily adapted to a multitude of differently sized and configured instruments, including fluid dispensers, that are used in the assembly of disc drives.

Mounting member 236 preferably comprises a relatively thin band 237 of electrically conductive material having a layer 239 of conductive adhesive for adhesively bonding band 237 to and partially about dispenser 212. Band 237 preferably has a width sized so that the band is contacted by an operator when dispenser 212 is gripped by the operator. At the same time, band 237 preferably has a width sized for permitting adequate viewing of the fluid such as fluid epoxy contained within dispenser 212. Band 237 is formed from an electrically conductive material having a resistance less than or equal to $1 \times 10^{11}$ ohms. Preferably, band 237 is formed from a material having resistance less than or equal to $1 \times 10^4$ ohms. The band is preferably formed from a conductive material such as aluminum.

In the embodiment illustrated in FIG. 7, mounting member 236 wraps over conductive arm 238 to couple arm 238 against surface 217 of barrel 214. Because band 237 is preferably adhesively bonded to barrel 214 of dispenser 212 by a pressure sensitive adhesive, mounting member 236 may be easily removed from dispenser 212 and re-adhered to an alternative dispenser. As can be appreciated, conductive arm 238 may be electrically coupled to mounting member 236 by a variety of other attachment mechanisms. For example, layer 239 may be non-conductive when arm 238 is directly electrically connected to band 237. Mounting member 236 preferably comprises a conductive tape such as 3M 1170 aluminum tape with conductive adhesive supplied by Minnesota Mining and Manufacturing Corporation of St. Paul, Minn.

Similar to mounting member 36, mounting member 236 is electrically grounded by ground connection glove 232. Ground connection glove 232 is connected to wrist strap 42, resistor 45 and ground conductor 44, as described in connection with FIG. 1. As a result, mounting member 236 grounds and drains static charge build-up from barrel 214 of dispenser 212. As shown by FIG. 7, mounting member 236 conforms to surface 217 of dispenser 212 and does not interfere with the operator's hand grasping dispenser 212. Overall, grounding attachment 230 and ground connection 232 form an electrical pathway from needle 226 to ground for draining static charge. The electrical pathway formed by grounding attachment 230 and ground connection 232 has a maximum total resistance in series of about $1.0 \times 10^{11}$ ohms. Preferably, the electrical pathway has as low of an electrical resistance as possible between needle 226 and ground. Because the electrical pathway has a resistance in series at least within the conductive range of resistance, grounding system 210 effectively drains static charge from needle 226 of dispenser 212 and limits the amount of voltage existing at the tip of needle 226. In addition, grounding system 210 provides a grounding connection that is reliable, ergonomic and contaminant free.

Figure 8:
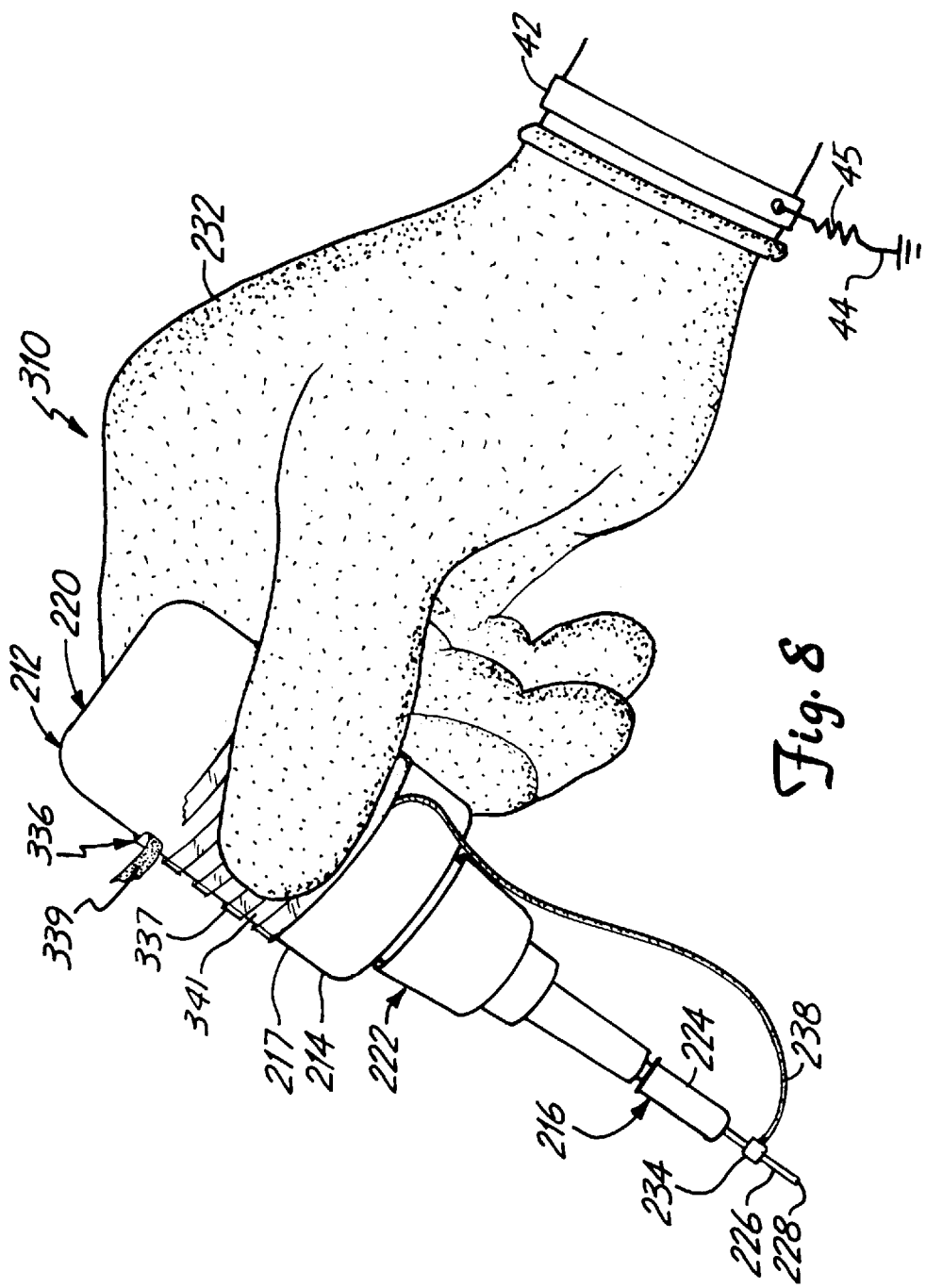
FIG. 8 is a perspective view, as in FIG. 1, of an electrical grounding system according to a second modification of the present invention including a grounding attachment coupled to a dispenser.
Figure 9:
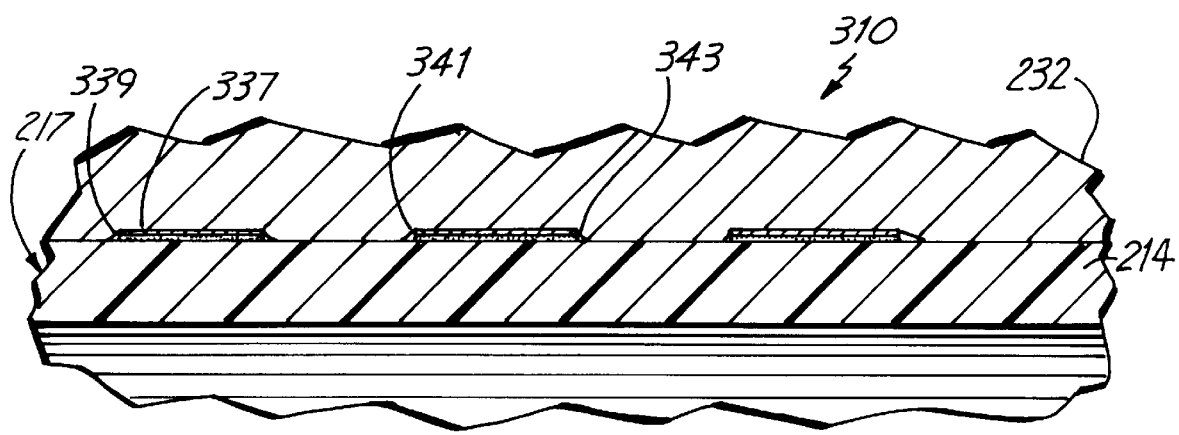
FIG. 9 is a section view of a conductive mounting member of the embodiment shown in FIG. 8.

FIGS. 8 and 9 illustrate electrostatic grounding system 310, an alternate embodiment of grounding system 210 shown in FIG. 7. Grounding system 310 is similar to grounding system 210 except that grounding system 310 includes mounting member 336 in place of mounting member 236. Mounting member 336 is similar to mounting member 236 except that mounting member 336 includes bands 337 each having an adhesive layer 339 for attaching mounting member 336 to dispenser 212. As shown by FIG. 8, gaps 341 between succession bands 237 to allow viewing of dispenser 212 and allow detection of fluids within dispenser 212. Preferably, bands 337 comprise a single spirally wrapped conductive tape forming plural convolutions and spaced about dispenser 212 to permit viewing of dispenser 212. To provide even greater viewing of dispenser 212, bands 337 are formed from a translucent material and preferably from a transparent material.

Adhesive layer 339 adhesively couples bands 337 about surface 217 of barrel 214 and also secures conductive arm 238 against surface 217 of barrel 214. Adhesive layer 339 is preferably formed from an electrically conductive adhesive.

As best shown by FIG. 9, band 337 wraps partially about dispenser 212 and includes edges 341, 343 which define a width. The width of band 337 is sized so that at least one edge 341, 343 is contacted by glove 232 when dispenser 212 is gripped by the operator. As a result, the operator makes electrical contact with adhesive layer 339 when dispenser 212 is gripped. Because band 337 is sized and configured so that at least one edge 341, 343 is contacted by the operator when dispenser 212 is gripped by the operator, band 337 may be formed from a variety of materials including both conductive and non-conductive materials as desired.

Figure 10:
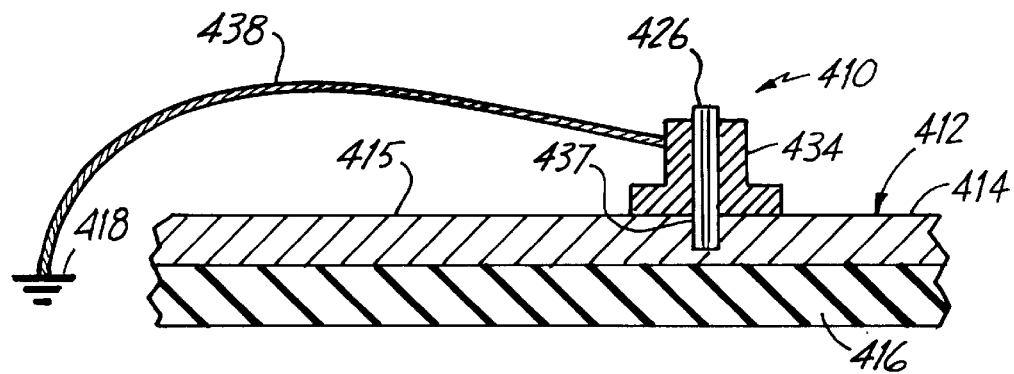
FIG. 10 is a section view of an electrical grounding system according to a third modification of the present invention including a grounding attachment coupled to a fixture.
Figure 11:
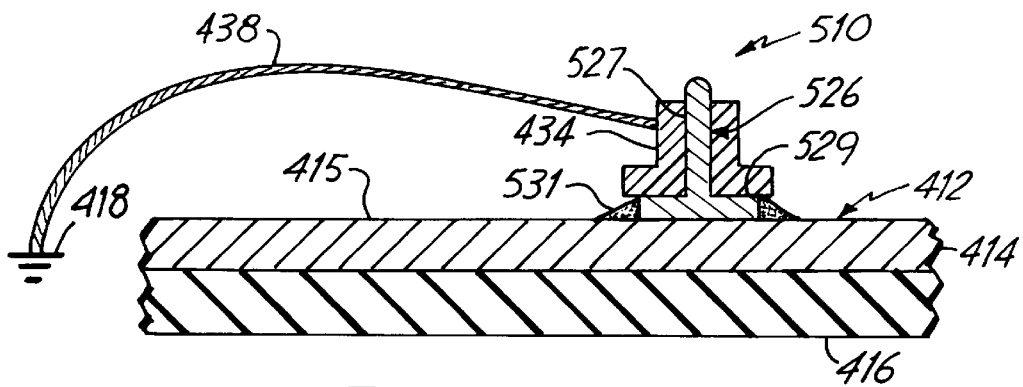
FIG. 11 is a section view, as in FIG. 10, of an electrical grounding system according to a fourth modification of the present invention including a grounding attachment coupled to a fixture.

The bands forming mounting member 336 preferably comprises 3M 40 tape supplied by Minnesota Mining and Manufacturing Corporation, of St. Paul, Minn. 3M 40 conductive tape includes a top surface (band 337) made of mylar coated with an electrically conductive adhesive (adhesive 339) fixed to one side FIGS. 10 and 11 illustrate grounding systems 410 and 510, alternative embodiments of the grounding systems illustrated in FIGS. 1–9. The exemplary grounding systems 410 and 510 illustrated are for electrically grounding devices such as fixtures which are used for assembling or testing a disc drive. FIG. 10 is a cross-sectional view of grounding system 410 electrically grounding fixture 412. Fixture 412 includes electrically conductive member 414. Electrically conductive member 414 is formed from a material having a resistance having a resistance of less than 100 ohms and has a conductive surface 415 that is placed in electrical contact with a magnetic head (not shown) of a disc drive assembly during assembly or test. Fixture 412 may by a dispenser, such as a syringe, or other tool or device, such as a microscope platform, used in the assembly or test of the disc drive. Member 414 is separated from ground by a supradissipative resistance (i.e. a resistance greater than $1 \times 10^{11}$ ohms) as schematically illustrated by nonconductive layer 416. As can be appreciated, member 414 may be separated from ground by a supradissipative resistance by any one of a variety of structures such as lubricated ball bearings, rubber feet or grommets or actual non-conductive layers between member 414 and an electrical ground. Because member 414 is separated from ground by a supradissipative resistance, electrostatic charge built-up within fixture 412 may discharge when placed in electrical contact with an adjacent member in electrical contact with the magnetic head of the disc drive assembly. This electrostatic discharge from member 414 is conducted to the magnetic head by a direct electrical continuity or dielectric breakdown. Grounding system 410 electrically grounds member 414 to ensure that member 414 and the surface of the disc drive assembly coming into contact with member 414 are at an equal to near equal electrical potential.

Grounding system 410 provides an electrical path from member 414 of the fixture to electrical ground 418 and generally includes rod 426, engaging member 434, and arm 438. Rod 426 comprises an elongate shaft or pin made of an electrically conductive material, such as 304 stainless steel, partially inserted into bore 437 in member 414 of fixture 412. Rod 426 preferably comprises a roll pin press fit into bore 437 so as to project from surface 415 of member 414. Because rod 426 preferably comprises a roll pin, rod 426 may be easily and reliably electrically coupled to member 414 of fixture 412 without member 414 having to be drilled and tapped or threaded and without tape or other affixing means which often proves to be unreliable during the assembly process.

Rod engaging member 434 preferably includes a bore (not shown) into which a tinned end of conductive arm 438 is inserted and trimmed. Preferably, arm 438 is formed of a copper braid, such as that used for arm 238 in FIG. 8. The copper braid is soldered or welded to engaging member 434 to assure good electrical and mechanical connection. Arm 438 may be attached to member 434 by other attachment techniques, such as welding, solder, swag attachment or threaded fastener. The opposite end of arm 438 is connected to ground 418. A connection, including a safety resistor described in connection with FIG. 1, may be used if desired.

Rod engaging member 434 physically and electrically engages rod 426 to provide a reliable electrical pathway from member 414 through rod 426 to rod engaging member 434. Rod engaging member 434 preferably includes an electrically conductive receptacle or bore receiving and electrically connected to rod 426 by interference fit to provide a reliable electrical connection between engaging member 434 and rod 426. The fixture is grounded simply by assembling engaging member 434 over rod 426 to hold member 434 against surface 415 by interference fit with rod 426.

FIG. 11 illustrates a modification of the system shown in FIG. 10 employing a pin unit 526 that includes a pin portion 527 and head 529 formed of conductive material, such as 304 stainless steel. Head 529 is fastened to surface 415 of conductive member 414, such as by conductive epoxy or solder beads 531, thereby establishing good mechanical and electrical connection between pin unit 526 and member 414. Engaging member 434 receives pin portion 527 therein in interference fit to electrically ground member 414 of the fitting.

In conclusion, grounding systems 10, 210, 310 provides a reliable, continuous electrical path or circuit from needles 26, 226 of dispensers 12, 212 through grounding attachments 30, 130, 230 and ground connection 32 to a good source of ground potential. This electrical pathway has a maximum resistance in series of about $1.0 \times 10^{11}$ ohms. Because the overall resistance in series of the electrical pathway formed by grounding systems 10, 210, 310 are within the conductive range, grounding systems 10, 210, 310 effectively drain static charge and minimize or eliminate voltages existing at needles 26, 226. Preferably, grounding systems 10, 210, 310 reduce voltages at needles 26, 226 to levels below allowable voltage levels based upon the sensitivity of the magnetic head to voltage. It has been found that the grounding system according to the present invention using a resistance path less than about $10^{11}$ ohms reduces voltages at the fixture to less than about three volts, and usually to less than one volt within two seconds. As a result, grounding systems 10, 210, 310 prevent damage to the magnetic head during assembly caused by electrostatic discharges from needles 26, 226 of dispensers 12, 212. At the same time, grounding systems 10, 210, 310 do not interfere with the operator's use of dispensers 12, 212 and are extremely ergonomic. In addition, grounding systems 10, 210, 310 do not contaminate components of the disc drive assembly being assembled and permit easy determination of the amount of fluids within dispensers 12, 212. As can be appreciated, grounding systems 10, 210, 310 may be easily adapted to various other instruments used during assembly of disc drive components which are in electrical contact with the magnetic head.

Although the present invention has been described with reference to preferred embodiments, workers skilled in the art will recognize that changes may be made in form and detail without departing from the spirit and scope of the invention.

What is claimed is:

1. A grounding system for a manually operated fluid dispenser for dispensing fluids onto a disc drive surface in electrical contact with a magnetic head, the dispenser having a barrel for containing fluid to be dispensed, the barrel being arranged to be grasped by an operator when dispensing fluids onto the disc drive surface, and a dispensing tip rigidly mounted to and extending from the barrel, the dispensing tip having a conductive surface and defining an opening through which fluids are dispensed from the barrel onto the disc drive surface, the grounding system comprising:

an electrically conductive mounting member so disposed and arranged to attach to and at least partially surround the barrel as to be grasped by the operator when the operator dispenses fluids onto the disc drive surface;

an electrically conductive receptacle extending from and electrically connected to the mounting member, the receptacle being disposed and arranged with respect to the mounting member to receive the dispensing tip when the mounting member at least partially surrounds the barrel, the receptacle including a resilient member arranged to bias against the conductive surface of the received dispensing tip to thereby engage the conductive surface so that the conductive dispensing tip and the conductive mounting member are at the same potential; and electrically conductive means electrically connected between the mounting member and ground.

2. The grounding system of claim 1 wherein the barrel is non-conductive.

3. The grounding system of claim 1 wherein the dispensing tip is a needle and the receptacle includes an electrically conductive tube through which the needle is inserted.

4. The grounding system of claim 3 wherein the resilient member comprises at least one electrically conductive prong within and coupled to the electrically conductive tube, wherein the prong is resiliently biased into contact with the received needle.

5. The grounding system of claim 1 wherein the dispensing tip is a needle and the receptacle includes a clip configured for holding the needle.

6. The grounding system of claim 5 wherein the clip comprises a body defining an aperture for receiving the needle, and a finger projecting from the body into the aperture, wherein the finger clamps the received needle against the body.

7. The grounding system of claim 1 wherein the dispensing tip is a needle and the electrically conductive mounting member includes an electrically conductive sleeve configured for at least partially surrounding the barrel.

8. The grounding system of claim 7 wherein the electrically conductive sleeve is substantially C-shaped for partially encircling the barrel.

9. The grounding system of claim 7 including an electrically conductive rigid band fixedly coupled to the sleeve and the receptacle, the rigid band positioning the conductive sleeve relative to the barrel when the resilient member engages the needle.

10. The grounding system of claim 9 wherein the needle is spaced from the conductive sleeve by a distance and wherein the rigid band has a length greater than the distance spacing apart the needle and the mounting member so that the receptacle may be removed from the needle.

11. The grounding system of claim 1 wherein the electrically conductive mounting member is manually pliable so as to conform to and wrap at least partially about the barrel.

12. The grounding system of claim 11 wherein the mounting member comprises conductive tape including a band with an adhesive layer secured at least partially about the barrel, wherein at least one of the band and the adhesive layer are electrically conductive.

13. The grounding system of claim 11 wherein the mounting member includes a band wrapped at least partially about the barrel, the band having a width sized so that the band is contacted by an operator when the dispenser is gripped by the operator.

14. The grounding system of claim 13 wherein the mounting member includes a band spirally wrapped and spaced about the barrel to permit viewing the barrel.

15. The grounding system of claim 11 wherein the electrically conductive means includes an electrically conductive glove arranged to fit a hand of the operator of the dispenser so that the glove contacts the conductive band.

16. The grounding system of claim 15 including a safety resistor in series between the glove and ground, the safety resistor having a resistance value not greater than ten megohms.

17. A device for grounding an electrically conductive needle of a dispenser, the device comprising:
an electrically conductive receptacle engaging and electrically connected to the needle; and
electrical conductive means electrically connected to the conductive receptacle for electrically grounding the receptacle the receptacle including an electrically conductive tube through which the needle is inserted, and at least one electrically conductive prong within and coupled to the electrically conductive tube, wherein the prong is resiliently biased into contact with the needle.

18. A device for grounding an electrically conductive needle of a dispenser, the device comprising:
an electrically conductive receptacle engaging and electrically connected to the needle; and
electrical conductive means electrically connected to the conductive receptacle for electrically grounding the receptacle, the receptacle including a clip configured for holding the needle, the clip including a body defining an opening for receiving the needle, and a finger projecting from the body into the opening, wherein the finger clamps
the needle against the body.

19. The device of claim 18 wherein the dispenser comprises a tube having a narrowing end through which the needle projects and wherein the electrical conductive means includes an electrically conductive mounting member configured for attachment to the tube, and an electrically conductive arm extending from the mounting member to the receptacle.

20. The device of claim 19 wherein the electrically conductive mounting member includes an electrically conductive sleeve configured for at least partially surrounding the dispenser tube.

21. The device of claim 20 wherein the electrically conductive sleeve is substantially C-shaped for partially encircling the dispenser tube.

22. The device of claim 19 wherein the electrical conductive means further includes an electrically conductive glove for being placed in electrical contact with the mounting member, wherein the glove is electrically connected to ground.

23. The device of claim 22 wherein the electrical conductive means further includes an electrically conductive wrist strap for being worn by an operator, wherein the wrist strap is electrically connected to the glove, and an electrical conductor extending from the wrist strap to ground.

24. The device of claim 23 wherein the electrical conductor includes a safety resistor in series between the glove and ground, the safety resistor having a resistance value not greater than ten megohms.

25. A system for applying fluids onto a surface in electrical contact with a magnetic head, the system comprising:
a syringe having a conductive needle through which fluid is dispensed onto the surface and a barrel for being grasped by an operator;
an electrically conductive attachment coupled to the syringe, the attachment including:
an electrically conductive receptacle engaging and electrically connected to the needle;
an electrically conductive mounting member configured for attachment to the barrel of the syringe as to be grasped by the operator when the operator dispenses fluids onto the disc drive surface; and
an electrical conductor extending from the mounting member to the receptacle so that the conductive needle and the conductive mounting member are at the same potential; and
an electrically conductive glove for being worn by the operator and for electrically contacting the electrically conductive mounting member, wherein the electrically conductive glove is grounded.

26. The system of claim 25 wherein the electrically conductive mounting member includes an electrically conductive sleeve configured for at least partially surrounding the barrel of the syringe.

27. The system of claim 25 wherein the barrel is nonconductive.

28. The system of claim 25 wherein the receptacle includes a clip configured for holding the needle.

29. The system of claim 28 wherein the clip comprises a body defining an aperture for receiving the needle, and a finger projecting from the body into the aperture, wherein the finger clamps the needle against the body.

30. The system of claim 25 wherein the receptacle includes an electrically conductive tube through which the needle is inserted.

31. The system of claim 30 wherein the receptacle further includes at least one electrically conductive prong within and coupled to the electrically conductive tube, wherein the prong is resiliently biased into contact with the needle.

32. The system of claim 25 further including an electrically grounded wrist-strap electrically connected to the electrically conductive glove.

33. The system of claim 32 including a safety resistor in series between the glove and ground, the safety resistor having a resistance value not greater than ten megohms.

34. The system of claim 33 wherein the electrically conductive attachment, the electrically conductive glove, the electrically grounded wrist strap and the safety resistor have a maximum total resistance in series of less than $1.0 \times 10^{11}$ ohms.

35. The system of claim 25 further including a fixture arranged to be placed in electrical contact with a conductive portion of a disc drive assembly in electrical contact with the magnetic head and an electrostatic grounding system for grounding the fixture, the electrostatic grounding system comprising:

an electrically conductive engagement device for mechanically engaging the fixture in electrical contact therewith;

an electrically conductive coupler mechanically and electrically connected to the engagement device; and electrically conductive connection means electrically connected between the conductive coupler and a source of ground potential.

36. The system of claim 35 wherein the electrically conductive engagement device comprises an electrically conductive rod mechanically supported by and in electrical contact with the fixture, and the electrically conductive coupler comprises a conductive receptacle for receiving the electrically conductive rod, the electrically conductive receptacle including means coupled to the receptacle for mechanically and electrically engaging the rod.

37. The system of claim 36 wherein the electrically conductive rod includes a head rigidly mounted to a surface of the fixture.

38. The system of claim 36 wherein the conductive receptacle includes a bore in interference fit with the rod.

39. The system of claim 38 wherein the electrically conductive rod is interference fit to the fixture.

40. The system of claim 25 wherein the electrically conductive mounting member includes an electrically conductive sleeve configured for at least partially surrounding the barrel.

41. The system of claim 40 wherein the electrically conductive sleeve is substantially C-shaped for partially encircling the barrel.

42. The system of claim 40 including an electrically conductive rigid band fixedly coupled to the sleeve and the receptacle, the rigid band positioning the conductive sleeve relative to the barrel when the resilient member engages the needle.

43. The system of claim 42 wherein the needle is spaced from the conductive sleeve by a distance and wherein the rigid band has a length greater than the distance spacing apart the needle and the mounting member so that the receptacle may be removed from the needle.

44. The system of claim 25 wherein the electrically conductive mounting member is manually pliable so as to conform to and wrap at least partially about the barrel.

45. The system of claim 44 wherein the mounting member comprises conductive tape including a band with an adhesive layer secured at least partially about the barrel, wherein at least one of the band and the adhesive layer are electrically conductive.

46. The system of claim 44 wherein the mounting member includes a band wrapped at least partially about the barrel, the band having a width sized so that the band is contacted by an operator when the syringe is gripped by the operator.

47. The system of claim 46 wherein the mounting member includes a band spirally wrapped and spaced about the barrel to permit viewing the barrel.

* * * * *

UNITED STATES PATENT AND TRADEMARK OFFICE
CERTIFICATE OF CORRECTION

PATENT NO. : 5,855,301
DATED : JANUARY 5, 1999
INVENTOR(S) :
    C. FRED MYKKANEN ET AL.

It is certified that error appears in the above-identified patent and that said Letters Patent is hereby corrected as shown below:

Col. 17, line 48, delete "receptacle", insert --receptacle,--

Signed and Sealed this

Fifth Day of October, 1999

Attest:

Q. TODD DICKINSON

Attesting Officer    Acting Commissioner of Patents and Trademarks